G. R. SHEPHERD.
LIQUID MIXING AND DELIVERING APPARATUS.
APPLICATION FILED APR. 16, 1915.
1,174,093.
Patented Mar. 7, 1916.
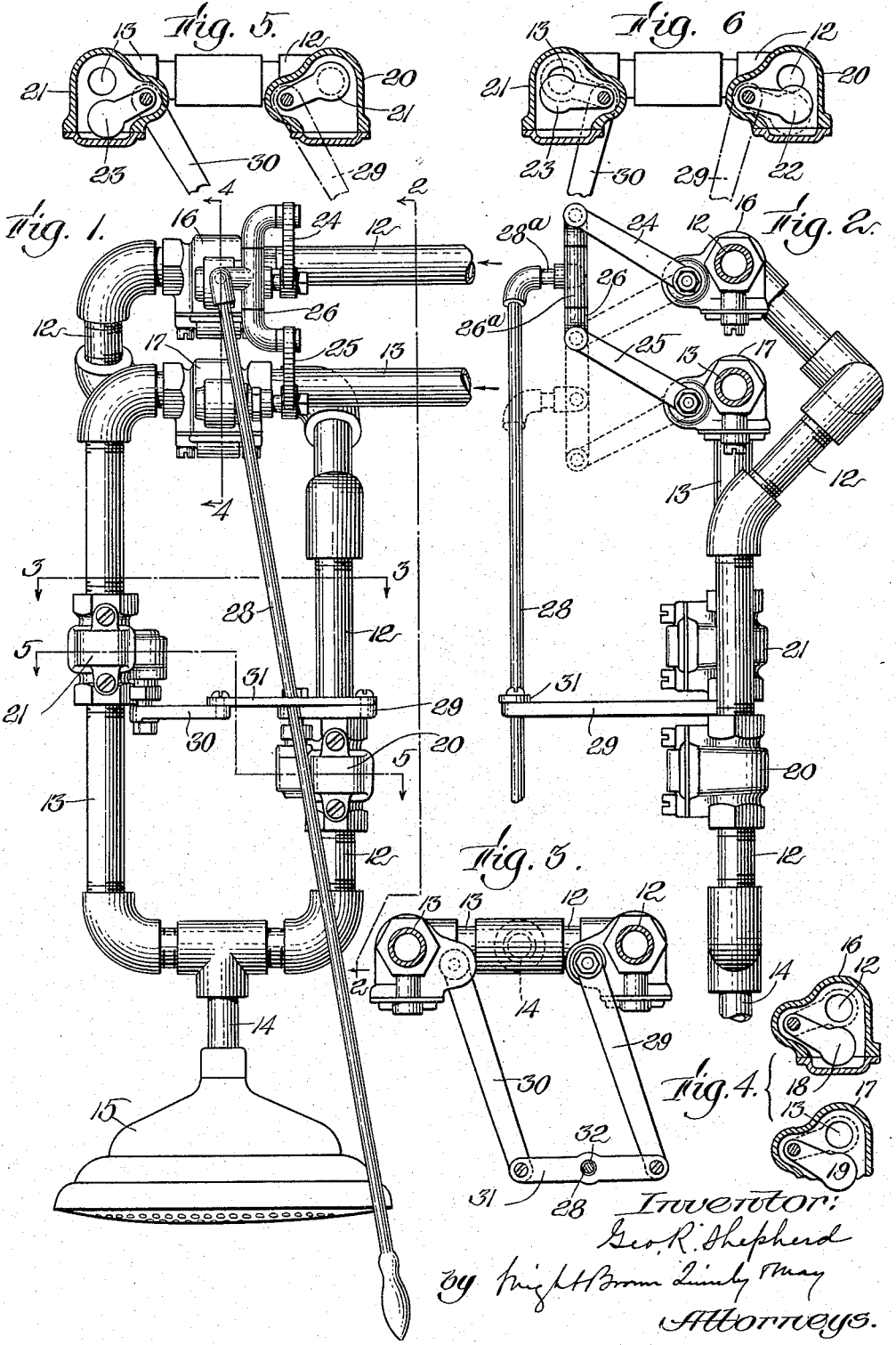

UNITED STATES PATENT OFFICE.

GEORGE R. SHEPHERD, OF BROOKLINE, MASSACHUSETTS, ASSIGNOR OF ONE-HALF TO GEORGE N. KAYE, OF BOSTON, MASSACHUSETTS.

LIQUID MIXING AND DELIVERING APPARATUS.

1,174,093. Specification of Letters Patent. Patented Mar. 7, 1916.

Application filed April 16, 1915. Serial No. 21,641.

*To all whom it may concern:*

Be it known that I, GEORGE R. SHEPHERD, a citizen of the United States, and resident of Brookline, in the county of Norfolk and State of Massachusetts, have invented certain new and useful Improvements in Liquid Mixing and Delivering Apparatus, of which the following is a specification.

This invention relates chiefly to apparatus for controlling a mixture of hot and cold water delivered through the distributing nozzle of a shower bath or through any other outlet.

The invention has for its object to enable the user of the mixture to simultaneously turn on and shut off hot and cold water flowing through two supply conduit portions and to utilize the means employed for this purpose to vary the relative proportions of two streams of hot and cold water passing through said portions to a mixing conduit portion, which may terminate in a distributing nozzle, so that, by practically a single movement, a mixture of any desired temperature may be instantly produced and delivered.

The invention consists in the improvements which I will now proceed to describe and claim.

Of the accompanying drawings forming a part of this specification: Figure 1 represents a side elevation of an apparatus embodying the invention, including a shower bath nozzle; Fig. 2 represents an edge view of the same, the nozzle being omitted; Fig. 3 represents a section on line 3—3 of Fig. 1, and a plan view of parts below said line; Fig. 4 represents a section on line 4—4 of Fig. 1; Fig. 5 represents a section on line 5—5 of Fig. 1; Fig. 6 represents a view similar to Fig. 5, showing a different valve adjustment.

The same reference characters indicate the same or similar parts in all the views.

In the drawings, 12 and 13 represent independent supply conduits connected with sources of supply of hot and cold water respectively, and 14 represents a mixing conduit communicating with said supply conduits and preferably including a shower bath nozzle 15 having a perforated bottom, the said conduits being preferably supported with the nozzle 15 suitably elevated above a bath tub or other receptacle. The reference numerals 12 and 13 are repeated several times to indicate different sections of the conduits. As here shown, each of said supply conduits is angularly formed, a part of each extending horizontally and a part vertically.

16 and 17 represent controlling valve casings forming parts of the horizontal portions of the supply conduits and having seats for the movable controlling valve members 18 and 19 (Fig. 4).

20 and 21 represent proportioning valve casings forming parts of the vertical portions of the supply conduits, and having seats for the movable proportioning valve members 22 and 23. In the embodiment of my invention here shown, each valve member is of the swinging gate type and is in sliding contact with its seat, the controlling valve members swinging vertically and the proportioning valves swinging horizontally. The stems of the valve members are journaled in bearings in the valve casings. I do not limit myself, however, to this type of valve, but have shown the same as the best type of which I am at present aware.

To the stems of the controlling valve members 18 and 19 are attached vertically swinging parallel arms 24 and 25, the swinging ends of which are connected by a coupling yoke 26. The relative arrangement of the said arms and controlling valve members is such that the arms are adapted to move the controlling valve members in unison and simultaneously open and close the same. When said arms are raised, as shown by full lines in Fig. 2, the controlling valve members are fully open, as shown by full lines in Fig. 4, and when said arms are lowered, as shown by dotted lines in Fig. 2, the controlling valve members are fully closed, as shown by dotted lines in Fig. 4.

When the arms are in an intermediate position regulated streams of equal volume are permitted to flow through the supply conduits without affecting or varying the temperature of a mixture of said streams.

To the yoke 26 is jointed one end of a valve-operating rod or member 28, which is adapted to be moved endwise to swing the arms 24 and 25 vertically and open and close the controlling valve members.

To the stems of the proportioning valves 22 and 23 are attached horizontally swinging parallel arms 29, 30, the swinging ends of which are connected by a coupling bar 31 having an orifice 32 (Fig. 3) in which the rod 28 is movable endwise. The relative arrangement of the said arms and proportioning valve members is such that the arms are adapted to move the proportioning valve members simultaneously in opposite directions. When the arms are at one extreme of their swinging movement the controlling valve member 22 is closed and the valve 23 is open, as shown by Fig. 5. When the arms are at the other extreme of their movement the conditions are reversed, the valve member 22 being open and the valve member 23 closed, as indicated by dotted lines in Fig. 6. The valve members may be moved to any desired intermediate positions, as indicated by full lines in Fig. 6, to proportion the streams of water flowing through the supply conduits, by increasing the volume of either stream and decreasing the volume of the other, so that streams of different volume may be permitted to flow simultaneously to the mixing chamber, the temperature of the mixture of said streams being thus affected or varied.

The operation is as follows: Assuming that all the valve members are closed, the operator simultaneously opens the controlling valve members to any extent desired by moving the rod endwise, the rod acting as a push or a pull handle, and then adjusts the proportioning valve members by swinging the rod laterally, the rod acting as a lever fulcrumed on the yoke 26, and moving the proportioning valve arms through the coupling bar 31, which not only couples said arms together, but couples the rod to the arms.

An endwise movement of the rod 28 in the opposite direction closes the controlling valve members and shuts off the water, the proportioning valve members being left, if desired, in the last positions to which they were adjusted.

The jointed connection between the rod 28 and the yoke 26 should permit sufficient freedom of oscillating movement of the rod in different planes to enable it to freely perform its functions. As here shown, the rod has a bent end 28ª which is pivoted in a socket in a sleeve 26ª swiveled on the yoke 26, these parts forming a double jointed connection between the yoke and the rod. I have described this connection simply for illustration and do not limit myself thereto.

I have found that the described apparatus enables a mixture of any desired temperature to be formed and delivered very quickly, the operator imparting combined endwise and lateral movements to the rod 28 until water of the desired temperature and under the desired pressure is delivered.

In practice the volume or velocity of the discharge or effluent, but not the temperature thereof, is determined by the adjustment of the controlling valve members, the relative proportions of the hot and cold water from the two conduits, and therefore the temperature of the effluent depending on the relative positions of the proportioning valve members. The effluent may be cold water only or hot water only, one of the proportioning valve members being open and the other closed. If desired, however, the closing movement of the proportioning valve member of the cold water conduit may be limited, so that it will not wholly shut off the cold water, provision being thus made for preventing injury to a bather by a discharge of excessively hot water.

The terms "horizontal" and "vertical" are used relatively and for convenience and brevity of description, and are intended to convey the idea that in the illustrated embodiment of the invention the portions of the supply conduits which include the controlling valve casings are arranged at an angle to the portions which include the proportioning valve casings, this arrangement being essential in this embodiment of the invention.

It will be seen that an apparatus embodying my invention is characterized by independent supply conduits including valve casings, a mixing conduit communicating with the supply conduits, and flow-controlling and proportioning mechanism including controlling valve members and proportioning valves, and operating means coöperating with and common to said valve members, said mechanism having provisions for causing the apparatus to instantly deliver a mixture of hot and cold water proportioned as desired from the two conduits, and preferably having provisions also for delivering water from either conduit alone, water from the other conduit being shut off.

The invention characterized as above stated may be otherwise embodied without departure from the spirit of the invention.

Having described my invention, I claim:

1. A liquid mixing and delivering apparatus comprising independent supply conduits, one for hot and the other for cold liquid, a mixing conduit communicating with the supply conduits, flow-controlling means including controlling valves, and organized to simultaneously open and close the two conduits and to cause regulated streams of equal volume to flow therethrough without varying the temperature of a mixture of said streams, temperature-varying means including proportioning valves intermediate the controlling valves and the mixing chamber and organized to increase the flow through one of the conduits and at the same time decrease the flow through the other conduit, and to cause streams of different volume to flow simultaneously therethrough to the mixing chamber, thereby regulating the temperature of the effluent, and operating means common to said controlling and proportioning means.

2. A liquid mixing and delivering apparatus comprising independent supply concuits, one for hot and the other for cold liquid, a mixing conduit communicating with the supply conduits, flow-controlling means including controlling valves and organized to simultaneously open and close the two conduits and to cause regulated streams of equal volume to flow therethrough without varying the temperature of a mixture of said streams, temperature-varying means including proportioning valves intermediate the controlling valves and the mixing chamber and organized to increase the flow through one of the conduits and at the same time decrease the flow through the other conduit, and to cause streams of different volume to flow simultaneously therethrough to the mixing chamber, thereby regulating the temperature of the effluent, a manually operable operating member connected with the flow-controlling means, and connections between said member and the temperature-varying means.

3. A liquid mixing and delivering apparatus comprising two independent supply conduits, one for hot and the other for cold liquid, a mixing conduit communicating with said supply conduits, each supply conduit having a controlling valve casing and a proportioning valve casing, controlling valve members movable in said controlling valve casings to simultaneously open and close the supply conduits, and to cause regulated streams of equal volume to flow therethrough without varying the temperature of a mixture of said streams, temperature-varying valve members movable in said controlling valve casings to increase the flow through one of the conduits and at the same time decrease the flow through the other conduit and to cause streams of different volume to flow simultaneously therethrough to the mixing chamber, thereby regulating the temperature of the effluent, arms attached to the movable controlling valve members, a yoke connecting said arms, other arms attached to the movable proportioning valve members, a coupling bar connecting the proportioning valve arms and formed as a guide, and an operating rod jointed to said yoke to oscillate laterally thereon and movable endwise in said guide, the controlling valves being movable in unison by endwise movements of the rod, and the proportioning valves being movable simultaneously in opposite directions by lateral movements of the rod.

In testimony whereof I have affixed my signature.

GEORGE R. SHEPHERD.

Copies of this patent may be obtained for five cents each, by addressing the "Commissioner of Patents, Washington, D. C."